(12) United States Patent
Joshi et al.

(10) Patent No.: US 12,358,153 B2
(45) Date of Patent: Jul. 15, 2025

(54) CHARGING A BATTERY OF AN ELECTRIC VEHICLE HOVERING IN THE AIR

(71) Applicant: Toyota Motor Engineering & Manufacturing North America, Inc., Plano, TX (US)

(72) Inventors: Shailesh N. Joshi, Ann Arbor, MI (US); Yanghe Liu, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 875 days.

(21) Appl. No.: 17/559,157

(22) Filed: Dec. 22, 2021

(65) Prior Publication Data

US 2023/0192316 A1    Jun. 22, 2023

(51) Int. Cl.
| | |
|---|---|
| *B60L 53/12* | (2019.01) |
| *B25J 18/00* | (2006.01) |
| *B60L 53/38* | (2019.01) |
| *B60L 53/60* | (2019.01) |
| *B60L 58/12* | (2019.01) |
| *B64F 1/36* | (2017.01) |

(52) U.S. Cl.
CPC ............... *B60L 53/12* (2019.02); *B25J 18/00* (2013.01); *B60L 53/38* (2019.02); *B60L 53/60* (2019.02); *B60L 58/12* (2019.02); *B64F 1/362* (2013.01); *B60L 2200/10* (2013.01)

(58) Field of Classification Search
CPC .......... B60L 53/12; B60L 53/36; B60L 53/38; B60L 53/60; B60L 58/12; B60L 2200/10; B25J 18/00; B64U 50/35; Y02T 10/70; Y02T 10/7072; Y02T 90/12
See application file for complete search history.

(56) References Cited

U.S. PATENT DOCUMENTS

| | | | |
|---|---|---|---|
| 11,027,838 B2 | 6/2021 | Clemente et al. | |
| 11,485,494 B2 * | 11/2022 | Naderi | H02J 50/90 |
| 2012/0181981 A1 * | 7/2012 | Wechlin | B60L 53/80 |
| | | | 320/108 |
| 2017/0320569 A1 * | 11/2017 | Gordon | B60L 53/80 |

(Continued)

OTHER PUBLICATIONS

Shuttleworth, J., "New SAE Wireless Charging standard is EV game-changer", Oct. 22, 2020, SAE International, Retrieved from: https://www.sae.org/news/2020/10/new-sae-wireless-charging-standard-is-ev-game-changer, 7 pages.

(Continued)

*Primary Examiner* — Richard Isla
*Assistant Examiner* — Johali A Torres Ruiz
(74) *Attorney, Agent, or Firm* — Christopher G. Darrow; Darrow Mustafa PC

(57) ABSTRACT

Systems, methods, and other embodiments described herein relate to charging a battery of an electric vehicle while the electric vehicle is hovering. In one embodiment, a method includes, responsive to determining that an electric vehicle does not include a receiver pad, inserting the receiver pad into the electric vehicle that is hovering in the air at a charging station. The method includes determining a space above a transmitter pad for the electric vehicle to hover based, at least in part, on a location and a size of the transmitter pad. The method includes charging a battery to a threshold value through the receiver pad.

20 Claims, 4 Drawing Sheets

(56) References Cited

U.S. PATENT DOCUMENTS

2018/0257502 A1    9/2018  Park
2020/0039373 A1    2/2020  Cantrell et al.
2022/0134893 A1*  5/2022  Liu ......................... B60L 53/57
                                                                         320/109

OTHER PUBLICATIONS

Adams, E., "Beta Reveals New Modular eVTOL Power Pad", Apr. 3, 2020, eVTOL, Retrieved from: https://evtol.com/features/beta-reveals-evtol-charging-station/, 7 pages.

* cited by examiner

CHARGING A BATTERY OF AN ELECTRIC VEHICLE HOVERING IN THE AIR

TECHNICAL FIELD

The subject matter described herein relates, in general, to systems and methods for charging a battery of an electric vehicle and, in particular, charging a battery of an electric vehicle hovering in the air.

BACKGROUND

Electric vehicles rely on stored energy within batteries for powering the vehicle from origin to destination. Such vehicles can be designed using multiple propellers for lift during take-off and landing such that take-off and landing can be achieved vertically without a runway. These vehicles are also referred to as electric Vertical Take-Off and Landing or "eVTOL" vehicles.

Energy density of battery storage systems may result in a limited range of eVTOL vehicles with small vehicle footprint. The range of such vehicles may be increased by using a larger battery pack or using a hybrid propulsion system, which increases a weight, size and footprint of the vehicle significantly.

Being limited by battery size, the eVTOL vehicle may need to make frequent stops to recharge its battery. However, space that can accommodate the eVTOL vehicle landing to have its battery recharged is limited.

SUMMARY

In various embodiments, example systems and methods relate to an improved approach to charging a battery of an electric vehicle while the electric vehicle is hovering. So as to reduce the weight of the electric vehicle, the electric vehicle has batteries that are smaller in size and do not hold a large amount of charge. As such, the battery in the electric vehicle may need to be recharged one or more times between the electric vehicle leaving an originating location and arriving at a final destination. Allocating space for an electric vehicle to land when the battery of the electric vehicle is being charged may be a challenge as space may be limited (e.g., a roof top of a building may include a space that is large enough to accommodate a charging station but may not be large enough to accommodate a parked electric vehicle). Additionally, in the case that the battery of the electric vehicle needs to be recharged frequently between the originating location and the final destination, multiple spaces along the route of the electric vehicle may have to be allocated. As a further example, charging stations for the battery of the electric vehicle may be easily accessible at the top of a tall building. However, the layout at the top of the building may not include a suitable space for an electric vehicle to land.

Therefore, in one or more embodiments, an inventive system is disclosed that improves the quality of air travel of an electric vehicle, particularly an electric aircraft, by charging the battery of the electric vehicle while the electric vehicle is hovering in the air and lowering an energy to mass ratio of the electric vehicle by using receiver pads that are removable from the electric vehicle.

The system functions to charge the battery of an electric vehicle while the electric vehicle is hovering and, as such, the electric vehicle does not need to be stationary and/or resting on a surface, such as a rooftop. Thus, in one arrangement, the system determines that the electric vehicle is hovering in the air at a charging station using, as an example, a sensor such as a camera or radar. Alternatively, and/or additionally, the system may determine that the electric vehicle is hovering in the air at the charging station based at least in part on communication between the electric vehicle and the system.

In one arrangement, the system functions to determine a space proximate to the charging station within which the electric vehicle may hover while the battery is being charged. In other words, the system determines a distance from the charging station that if the electric vehicle is within, the system is capable of charging the battery. More specifically, the system functions to determine the distance that the electric vehicle may maintain from a transmitter pad that is charging the battery of the electric vehicle. The charging station includes the transmitter pad, which has a smaller footprint than the electric vehicle, and is placed on a surface, such as the top of a tall building or on the ground. The transmitter pad generates an electromagnetic field that is used to charge the battery.

The system determines the distance based on the strength of the electromagnetic field in order to define an area in which the battery can effectively receive power. In one arrangement, the system determines the potential strength of the magnetic field by requesting the potential strength of the magnetic field from the charging station associated with the transmitter pad. Additionally, and/or alternatively, the system may use a sensor to detect the size of the transmitter pad and apply the detected size to a suitable algorithm to determine the potential strength of the magnetic field of the transmitter pad.

As previously mentioned, to reduce the weight of the electric vehicle when the electric vehicle is in flight, the electric vehicle can include removable receiver pads for charging the battery. The system can insert and remove the removable receiver pads. As such, the system can insert the removable receiver pads before charging the battery and remove the removable receiver pads after charging the battery. In such a case, the electric vehicle can travel from an originating location to a final destination without carrying the extra weight of the receiver pads, thereby improving overall operation.

Accordingly, the system, in one or more arrangements, determines whether the electric vehicle has a receiver pad. In the case that the receiver pad is present, the system determines a location for charging, as previously described. When the receiver pad is not present, in at least one arrangement, the system inserts the receiver pad into the electric vehicle. As an example, the system requests that the charging station insert the receiver pad into the electric vehicle. As previously mentioned, the electric vehicle is capable of minimizing weight during flight and dynamically adapting to performing charging while hovering in the air.

In order to begin charging the battery, the system determines whether the electric vehicle is hovering in the space where the battery of the electric vehicle can be charged by using sensors and/or communication between the electric vehicle and the system. The system then activates the transmitter pad to start charging the battery via the receiver pad to a threshold value. Upon detecting that the charge level of the battery has reached the threshold level, the system deactivates the transmitter pad. The system then removes the receiver pad to reduce the weight of the electric vehicle for flight. In this way, the system improves the quality of air travel of the electric vehicle by charging the battery of the electric vehicle while the electric vehicle is hovering in the air and having receiver pad(s) that are removable from the electric vehicle.

In one embodiment, a method is disclosed. The method includes, responsive to determining that an electric vehicle does not include a receiver pad, inserting the receiver pad into the electric vehicle that is hovering in the air at a charging station. The method includes determining a space above a transmitter pad for the electric vehicle to hover based, at least in part, on a location and a size of the transmitter pad. The method includes charging a battery to a threshold value through the receiver pad.

In one embodiment, a system is disclosed. The system includes one or more processors and a memory communicably coupled to the one or more processors. The memory stores a control module including instructions that, when executed by the one or more processors, cause the one or more processors to, responsive to determining that an electric vehicle does not include a receiver pad, insert the receiver pad into the electric vehicle that is hovering in the air at a charging station. The control module includes instructions to determine a space above a transmitter pad for the electric vehicle to hover based, at least in part, on a location and a size of the transmitter pad. The control module includes instructions to charge a battery to a threshold value through the receiver pad.

In one embodiment, a non-transitory computer-readable medium including instructions that, when executed by one or more processors, cause the one or more processors to perform various functions is disclosed. The instructions include instructions to, responsive to determining that an electric vehicle does not include a receiver pad, insert the receiver pad into the electric vehicle that is hovering in the air at a charging station. The instructions include instructions to determine a space above a transmitter pad for the electric vehicle to hover based, at least in part, on a location and a size of the transmitter pad. The instructions include instructions to charge a battery to a threshold value through the receiver pad.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
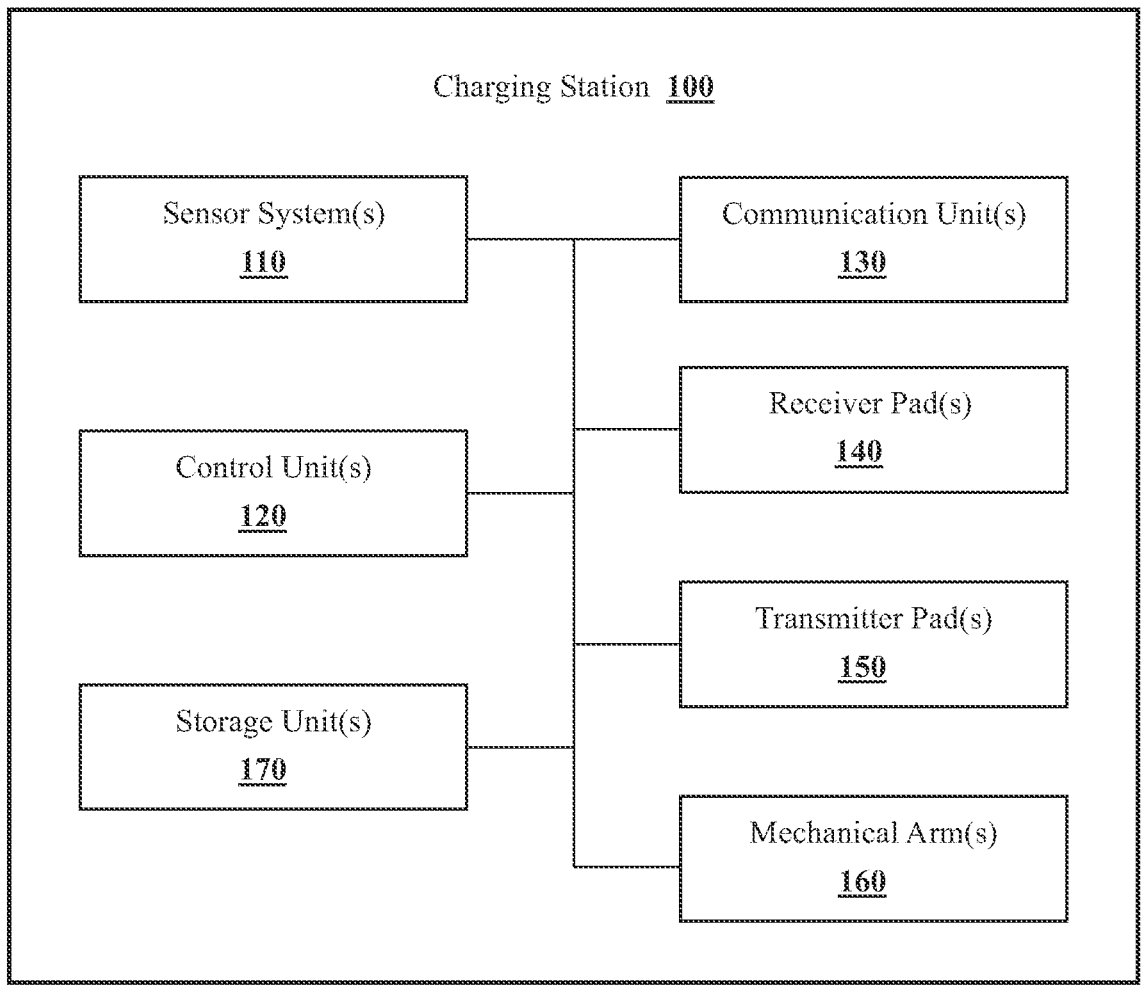
FIG. 1 illustrates one embodiment of a charging station within which systems and methods disclosed herein may be implemented.

Systems, methods, and other embodiments associated with an improved approach to charging a battery of an electric vehicle while the electric vehicle is hovering in the air are disclosed. As previously mentioned, so as to reduce the weight of the electric vehicle, the electric vehicle has batteries that are smaller in size and do not hold a large amount of charge. As such, the battery in the electric vehicle may need to be recharged one or more times between the electric vehicle leaving an originating location and arriving at a final destination. Allocating space for an electric vehicle to land when the battery of the electric vehicle is being charged may be a challenge as space may be limited (e.g., a roof top of a building may include a space that is large enough to accommodate a charging station but may not be large enough to accommodate a parked electric vehicle). Additionally, in the case that the battery of the electric vehicle needs to be recharged frequently between the originating location and the final destination, multiple spaces along the route of the electric vehicle may have to be allocated. As a further example, charging stations for the battery of the electric vehicle may be easily accessible at the top of a tall building. However, the layout at the top of the building may not include a suitable space for an electric vehicle to land.

Therefore, in various arrangements, disclosed systems and methods improve the quality of air travel of an electric vehicle, particularly an electric aircraft, by charging the battery of the electric vehicle while the electric vehicle is hovering in the air and lowering an energy to mass ratio of the electric vehicle by using receiver pads that are removable from the electric vehicle.

The system functions to charge the battery of an electric vehicle while the electric vehicle is hovering and, as such, the electric vehicle does not need to be stationary and/or resting on a surface, such as a rooftop. Thus, in one arrangement, the system determines that the electric vehicle is hovering in the air at a charging station using, as an example, a sensor such as a camera or radar. Alternatively, and/or additionally, the system may determine that the electric vehicle is hovering in the air at the charging station based at least in part on communication between the electric vehicle and the system.

In one arrangement, the system functions to determine a space proximate to the charging station within which the electric vehicle may hover while the battery is being charged. In other words, the system determines a distance from the charging station that if the electric vehicle is within, the system is capable of charging the battery. More specifically, the system functions to determine the distance that the electric vehicle may maintain from a transmitter pad that is charging the battery of the electric vehicle. The charging station includes the transmitter pad, which has a smaller footprint than the electric vehicle, and is placed on a surface, such as the top of a tall building or on the ground. The transmitter pad generates an electromagnetic field that is used to charge the battery.

The system determines the distance based on the strength of the electromagnetic field in order to define an area in which the battery can effectively receive power. In one arrangement, the system determines the potential strength of the magnetic field by requesting the potential strength of the magnetic field of the transmitter pad from the transmitter pad and/or the charging station associated with the transmitter pad. Additionally, and/or alternatively, the system may use a sensor to detect the size of the transmitter pad and apply the detected size to a suitable algorithm to determine the potential strength of the magnetic field of the transmitter pad.

As previously mentioned, to reduce the weight of the electric vehicle when the electric vehicle is in flight, the electric vehicle can include removable receiver pads for charging the battery. The system can insert and remove the removable receiver pads. As such, the system can insert the removable receiver pads before charging the battery and remove the removable receiver pads after charging the battery. In such a case, the electric vehicle can travel from an originating location to a final destination without carrying the extra weight of the receiver pads, thereby improving overall operation. Additionally, the cost of manufacturing an electric vehicle without receiver pads is less than the cost of manufacturing an electric vehicle with built-in receiver pads. In such a case, the cost of acquiring and installing the receiver pads in the electric vehicle is eliminated. Further, receiver pads that are stored outside the electric vehicle are more easily accessible for maintenance, which can prolong the life of the receiver pads.

As another point, since the charging station stores both the receiver pads and the transmitter pads, the charging station can ensure that the receiver pads and the transmitter pads are a compatible pair. In contrast, the receiver pad in an electric vehicle with built-in receiver pads may not be compatible with the transmitter pad available at the charging station. As such, it is beneficial for the charging station to store and provide both the receiver pads and the compatible transmitter pads used for charging, insofar as the receiver pads can connect to the electric vehicle.

Accordingly, the system, in one or more arrangements, determines whether the electric vehicle has a receiver pad. In the case that the receiver pad is present, the system determines a location for charging, as previously described. When the receiver pad is not present, in at least one arrangement, the system inserts the receiver pad into the electric vehicle. As an example, the system requests that the charging station insert the receiver pad into the electric vehicle. As previously mentioned, the electric vehicle is capable of minimizing weight during flight and dynamically adapting to performing charging while hovering in the air.

In order to begin charging the battery, the system determines whether the electric vehicle is hovering in the space where the battery of the electric vehicle can be charged by using sensors and/or communication between the electric vehicle and the system. The system then activates the transmitter pad to start charging the battery via the receiver pad to a threshold value. Upon detecting that the charge level of the battery has reached the threshold level, the system deactivates the transmitter pad. The system then removes the receiver pad to reduce the weight of the electric vehicle for flight. In this way, the system improves the quality of air travel of the electric vehicle by charging the battery of the electric vehicle while the electric vehicle is hovering in the air and having receiver pad(s) that are removable from the electric vehicle.

Referring to FIG. 1, an example of a charging station 100 is illustrated. The charging station 100 also includes various elements. It will be understood that, in various embodiments, it may not be necessary for the charging station 100 to have all of the elements shown in FIG. 1. The charging station 100 can have any combination of the various elements shown in FIG. 1. Further, the charging station 100 can have additional elements to those shown in FIG. 1. In some arrangements, the charging station 100 may be implemented without one or more of the elements shown in FIG. 1. While the various elements are illustrated as being located within the charging station 100, it will be understood that one or more of these elements can be located external to the charging station 100. Further, the elements shown may be physically separated by large distances and provided as remote services (e.g., cloud-computing services, software-as-a-service (SaaS), etc.).

Some of the possible elements of the charging station 100 are shown in FIG. 1 and will be described along with subsequent figures. However, a description of many of the elements in FIG. 1 will be provided after the discussion of FIGS. 2-4 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, as illustrated in the embodiment of FIG. 1, the charging station 100 can include one or more transmitter pad(s) 150. The transmitter pad 150 is a converter that is connected to an electric power grid. The transmitter pad(s) 150 can include a ground assembly coil for power coupling, a regulation controller for controlling the flow of power, a mechanism for activating and/or deactivating the transmitter pad, and a communication link for communicating with the charging station 100, the control unit(s) 120, the receiver pad(s) 140, and/or the electric vehicle. The transmitter pad(s) 150 can be movable. The transmitter pad(s) 150 can be placed on the ground and connected to the electric power grid as previously mentioned. Additionally, and/or alternatively, the transmitter pad(s) 150 can be stored in a storage unit 170 located in the charging station 100.

The charging station 100 can include one or more receiver pad(s) 140. The receiver pad 140 is a removable coil with rectification, filtering components, and charging control power electronics for power regulation, safety, and shutdown. The receiver pad(s) 140 can include a mechanism for activating and/or deactivating the receiver pad(s) 140 and can be configured to initialize settings on the receiver pad(s) 140. The receiver pad(s) 140 can include a communication link for communicating with the charging station 100, the transmitter pad(s) 150, and/or the electric vehicle. The receiver pad(s) 140 can be inserted into and/or removed from a cavity in the electric vehicle. As an example, the receiver pad(s) 140 can be stored in the storage unit 170 located in the charging station 100.

The charging station 100 can include one or more control units 120. The control unit 120 can be configured to, responsive to determining that the electric vehicle does not include the receiver pad(s) 140, insert the receiver pad(s) 140 into the electric vehicle that is hovering in the air at the charging station 100. The control unit 120 can be configured to determine a space above the transmitter pad(s) 150 for the electric vehicle to hover based, at least in part, on a location and a size of the transmitter pad(s) 150. Further, the control unit(s) 120 can be configured to charge a battery to a threshold value through the receiver pad(s) 140.

The charging station 100 can include one or more mechanical arms 160 capable of moving the receiver pad(s) 140 and/or the transmitter pad(s) 150. The mechanical arm(s) 160 may be of suitable material such as metal and/or plastic. The control unit(s) 120 can be configured to control the mechanical arm(s) 160 to move the receiver pad(s) 140 from the storage unit 170 and into the cavity of the electric vehicle. As another example, the control unit(s) 120 can control the mechanical arm(s) 160 to remove the receiver pad(s) 140 from the cavity of the electric vehicle and into the storage unit 170. As another example, the control unit(s) 120 can control the mechanical arm(s) 160 to move the transmitter pad(s) 150 from the storage unit(s) 170 and onto the surface or ground. As another example, the control unit(s) 120 can control the mechanical arm(s) 160 to lift the transmitter pad(s) 150 from the surface or ground and place in the storage unit(s) 170.

Figure 2:
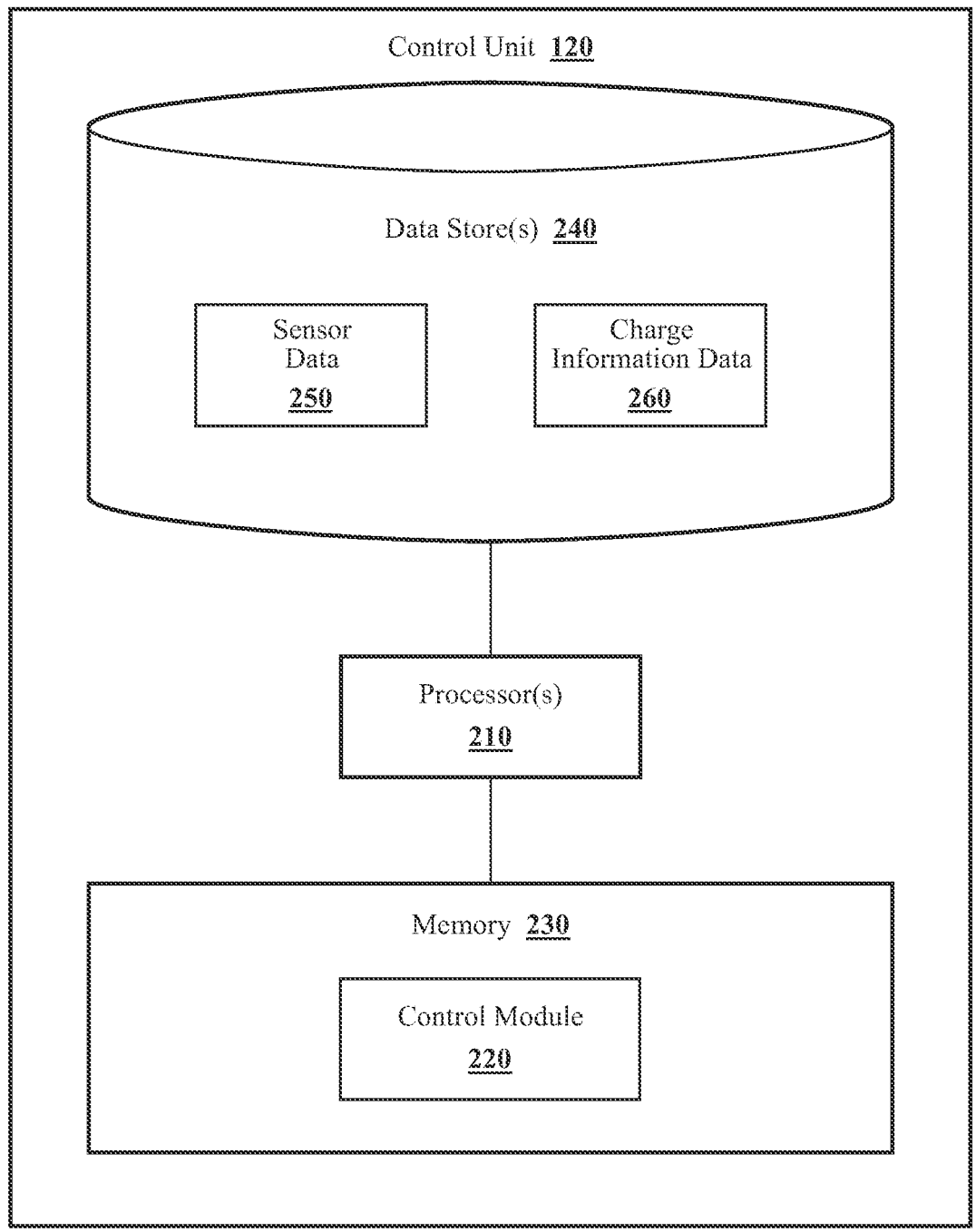
FIG. 2 illustrates one embodiment of a control unit that is associated with charging an electric vehicle that is hovering in the air.

With reference to FIG. 2, one embodiment of the control unit 120 is further illustrated. The control unit 120 is shown as including a processor 210. Accordingly, the processor 210 may be a part of the control unit 120, or the control unit 120 may access the processor 210 through a data bus or another communication path. In one or more embodiments, the processor 210 is an application-specific integrated circuit (ASIC) that is configured to implement functions associated with a control module 220. In general, the processor 210 is an electronic processor, such as a microprocessor, that is capable of performing various functions as described herein.

In one embodiment, the control unit 120 includes a memory 230 that stores the control module 220 and/or other modules that may function in support of charging the battery of the electric vehicle hovering in the air. The memory 230 is a random-access memory (RAM), read-only memory (ROM), a hard disk drive, a flash memory, or another suitable memory for storing the control module 220. The control module 220 is, for example, computer-readable instructions that, when executed by the processor 210, cause the processor 210 to perform the various functions disclosed herein. In further arrangements, the control module 220 is a logic, integrated circuit, or another device for performing the noted functions that includes the instructions integrated therein.

Furthermore, in one embodiment, the control unit 120 includes a data store 240. The data store 240 is, in one arrangement, an electronic data structure stored in the memory 230 or another data store, and that is configured with routines that can be executed by the processor 210 for analyzing stored data, providing stored data, organizing stored data, and so on. Thus, in one embodiment, the data store 240 stores data used by the control module 220 in executing various functions. For example, as depicted in FIG. 2, the data store 240 includes sensor data 250 and charge information data 260, along with, for example, other information that is used and/or produced by the control module 220. The sensor data 250 can originate from the sensor system 110 of the charging station 100. The sensor data 250 can include data from other suitable sensors that the charging station 100 is in communication with. In various approaches, the charge information data 260 includes information relating to the transmitter pad(s) 150, the receiver pad(s) 140, and electric vehicles that can be charged at the charging station 100. As an example, the charge information data 260 includes values used to determine the size of a magnetic field that the transmitter pad 150 is capable of generating. The charge information data 260 includes the values and/or factors that the control module 220 uses to determine the space above the transmitter pad 150 for the electric vehicle to hover based on the size of the magnetic field between the receiver pad 140 and the transmitter pad 150. As an example, the charge information data 260 includes characteristics of the receiver pad 140, such as the type and size of the receiver pad 140, the vehicles that are compatible with the receiver pad 140, and the sizes of a magnetic field that the receiver pad 140 can support. As another example, the charge information data 260 includes characteristics of the transmitter pad 150, such as the type and size of the transmitter pad 150, the receiver pads 140 that are compatible with the transmitter pads 150, and the sizes of a magnetic field that the transmitter pad 150 can generate.

While the control unit 120 is illustrated as including the various data elements, it should be appreciated that one or more of the illustrated data elements may not be included within the data store 240 in various implementations, and may be included in a data store that is external to the control unit 120. In any case, the control unit 120 stores various data elements in the data store 240 to support functions of the control module 220.

In one embodiment, the control module 220 includes instructions that, when executed by the processor(s) 210, cause the processor(s) 210 to, responsive to determining that the electric vehicle does not include the receiver pad 140, insert the receiver pad 140 into the electric vehicle that is hovering in the air at a charging station 100.

The control module 220, in at least one arrangement, monitors the sensor data 250 received from the sensor system 110 to determine whether the electric vehicle includes a receiver pad. As an example, the control module 220 polls the sensors of the sensor system 110 to request whether the electric vehicle includes the receiver pad. In such an example, the control module 220 may receive sensor data 250 that indicates that an attachment point such as a hook or a cavity in the electric vehicle that holds the receiver pad 140 is empty. Additionally, and/or alternatively, the control module 220 can communicate with the electric vehicle, inquiring whether the electric vehicle includes the receiver pad. In such an example, the control module 220 may receive communication from the electric vehicle indicating that the electric vehicle does not include a receiver pad 140, and/or is requesting a receiver pad 140. As such, based on the sensor data 250 and/or the communication with the vehicle, the control module 220 can determine that the electric vehicle does not include a receiver pad 140.

In response to determining that the vehicle does not include a receiver pad 140, the control module 220 causes the receiver pad 140 to be inserted into the electric vehicle. In one embodiment, the control module 220 includes instructions to communicate to request insertion of the receiver pad 140. In such a case, the control module 220 and the charging station may communicate over a suitable communication network such as Bluetooth or Wi-Fi. Additionally, and/or alternatively, the control module 220 includes instructions to cause the mechanical arm 160 to insert the receiver pad 140 according to a communication requesting the receiver pad 140. The control module 220 may control the mechanical arm 160 to retrieve the receiver pad(s) 140 from the storage unit 170 and place the receiver pad(s) 140 in the vehicle. In various embodiments, the electric vehicle may have different configurations in regards to a number of receiver pads, battery size, battery capacity, and so on. Thus, the control module 220 may determine the type and/or number of receiver pads 140 to place in the vehicle based on type and/or model of vehicle, the number of batteries to be charged, the threshold value, the amount of time available for the charge, the magnetic field to be generated, and the size and/or weight of the receiver pads 140.

The control module 220 further includes instructions that, when executed by the processor(s) 210, cause the processor(s) 210 to determine a space above the transmitter pad 150 for the electric vehicle to hover based, at least in part, on a location and a size of the transmitter pad 150. The control module 220 can monitor the sensor data 250 received from the sensor system 110 to determine whether there is a vehicle proximate to the charging station 100. As an example, the control module 220 polls the sensors of the sensor system 110 to request whether there is a vehicle within the external environment of the charging station 100. Further, the control module 220 polls the sensors for information about the vehicle that is proximate to the charging station 100. Additionally, and/or alternatively, the control module 220 can send out a request to communicate with any vehicles proximate to the charging station 100.

In such a case where the control module 220 communicates with an electric vehicle proximate to the charging station 100. The control module 220 may request information from the electric vehicle such as whether the electric vehicle intends to charge its battery, a threshold value that the battery should be charged to, and whether the electric vehicle includes a receiver pad 140.

Further, the control module 220 includes instructions that, when executed by the processor(s) 210, cause the processor(s) 210 to detect the location and the size of the transmitter pad 150, determine a size of a magnetic field between the receiver pad 140 and the transmitter pad 150 based on the location and the size of the transmitter pad 150, and determine the space above the transmitter pad 150 for the electric vehicle to hover based on the size of the magnetic field between the receiver pad 140 and the transmitter pad 150.

The control module 220 further includes instructions that, when executed by the processor(s) 210, cause the processor(s) 210 to detect the location and the size of the transmitter pad 150 using at least one of a sensor 110 and communicating directly or indirectly with the transmitter pad 150. As an example, the control module 220 receives sensor data 250 indicating the location and/or the size of the transmitter pad 150 in the charging station 100. As another example, the control module 220 communicates with the transmitter pad 150 and/or an entity such as a control component associated with the transmitter pad 150, requesting the location and/or the size of the transmitter pad 150. The control module 220 can further request any relevant information about the transmitter pad 150 such as the size of the magnetic field that the transmitter pad 150 can generate, from the transmitter pad 150.

The control module 220 can receive information that indicates that there is no transmitter pad 150 on the ground proximate to the charging station 100. In such a case, the control module 220 retrieves and places the transmitter pad 150 on the surface and/or the ground. As an example, the control module 220 communicates with the charging station 100 to request retrieving and placing the transmitter pad 150 on the surface and/or the ground. As another example, the control module 220 controls the mechanical arm 160 to retrieve the transmitter pad(s) 150 from the storage unit 170 and place the transmitter pad(s) 150 on the surface and/or the ground.

The control module 220 determines the size of the magnetic field between the receiver pad 140 and the transmitter pad 150 based on the location and the size of the transmitter pad 150. As an example, the control module 220 communicates with the charging station 100, requesting the size of the magnetic field that the transmitter pad 150 can generate. As another example, the control module 220 determines the size of the magnetic field that the transmitter pad 150 can generate based on the characteristics of the transmitter pad 150 that the control module 220 is aware of such as the size of the transmitter pad 150. The control module 220 may be aware of the type or model of the transmitter pad 150. Based on the location and/or the size, the control module 220 applies a suitable algorithm to determine the magnetic field that the transmitter pad 150 can generate. Based on the determined magnetic field, the control module 220 determines the distance that can exist between the transmitter pad 150 and the receiver pad 140 for the receiver pad 140 to charge the battery in the vehicle using a suitable algorithm. In other words, the control module 220 determines the space above the transmitter pad 150 for the electric vehicle to hover based on the size of the magnetic field between the receiver pad 140 and the transmitter pad 150. The control module 220 can determine whether the space can accommodate the size of the vehicle using sensor data 250 and suitable machine learning techniques.

The control module 220 can communicate with the vehicle to advise the vehicle about the space that the vehicle has to remain within so that the transmitter pad 150 and the receiver pad 140 can charge the vehicle. The control module 220 can wait to receive an acknowledgement message from the vehicle. The control module 220 can further inquire from the vehicle whether the vehicle is capable of hovering within the determined space. In the case where the vehicle responds that the vehicle is unable to hover within the determined space, the control module 220 can determine a space that the vehicle is capable of hovering within using sensor data 250 to determine where the vehicle is located. Additionally and/or alternatively, the control module 220 can communicate with the vehicle and inquire which space the vehicle is capable of hovering within. In the case that the space that the vehicle is capable of hovering within is beyond the reach of the transmitter pad 150, the control module 220 can determine the size of the magnetic field that can reach the vehicle at that space. The control module 220 can determine the distance between the vehicle and the transmitter pad 150, and then determine the size of the magnetic field that can cover the determined distance. As an example, the control module 220 can determine the distance between the vehicle and the transmitter pad 150 using sensor data 250. Then, the control module 220 can determine the size of the magnetic field that can cover the distance using a suitable algorithm. The control module 220 can further determine the type of transmitter pads 150 and/or the number of transmitter pads 150 that can be used to generate the magnetic field required to reach the vehicle at that distance.

The control module 220 can determine the type, the number of the transmitter pads 150 and the configuration, i.e., the arrangement, of the transmitter pads 150 on the surface or ground using suitable algorithms and/or machine learning techniques. After determining the type of transmitter pads 150, the number of transmitter pads 150, and the manner in which the transmitter pads 150 can be arranged, the control module 220 can control the mechanical arm 160 to move the transmitter pads 150 from the storage unit 170 to the surface or ground. The control module 220 can control the mechanical arm 160 to arrange the transmitter pads 150 in the determined configuration. As another example, the control module 220 can communicate with the charging station 100, indicating to the charging station 100 the type and number of transmitter pads 150 as well as the configuration of the transmitter pads 150 such that the charging station 100 can retrieve the type of transmitter pads 150, the number of transmitter pads 150 and place the transmitter pads 150 in the configuration.

The control module 220 further includes instructions that, when executed by the processor(s) 210, cause the processor(s) 210 to charge a battery to a threshold value through the receiver pad(s) 140.

The control module 220 can charge the battery to the threshold value through the receiver pad(s) 140. As an example, the control module 220 can determine the threshold value by communicating with the vehicle. The control module 220 can request how much to charge the battery from the vehicle. As another example, the control module 220 can determine the threshold value based on the model and/or type of battery in the vehicle. In such an example, the control module 220 can determine the charge that the battery can hold and equate that charge to the threshold value. As another example, the control module 220 can receive a user inputted value and equate that value to the threshold value.

The control module 220 can communicate with the transmitter pad(s) 150 and the receiver pad(s) 140 to determine that the transmitter pad(s) 150 and the receiver pad(s) 140 are ready to initiate charging the battery. The control module 220 can then activate the transmitter pad(s) 150 and the receiver pad(s) 140 to generate the magnetic field for charging the battery. The control module 220 can determine that the battery has reached the threshold value by communicating with one or more of the vehicle, the receiver pad(s), and the charging station. Upon determining that the battery has reached the threshold value, the control module 220 can deactivate the transmitter pad(s) 150 and the receiver pad(s) 140 to stop generating the magnetic field.

The control module 220 further includes instructions that, when executed by the processor(s) 210, cause the processor(s) 210 to, responsive to the battery reaching the threshold value, remove the receiver pad 140 from the electric vehicle using a mechanical arm 160. In such a case, the control module 220 can control the mechanical arm 160 to move the receiver pad(s) 140 out of the vehicle and into the storage unit 170. Further, the control module 220 can control the mechanical arm 160 to move the transmitter pad(s) 150 from the surface or ground and into the storage unit 170.

The control module 220 further includes instructions that, when executed by the processor(s) 210, cause the processor(s) 210 to, responsive to the battery reaching the threshold value, remove the receiver pad 140 from the electric vehicle by communicating with the charging station 100 to request removal of the receiver pad(s) 140. In such a case, the control module 220 can communicate with the charging station 100 and request that the charging station 100 move the receiver pad(s) 140 from the vehicle and into the storage unit 170. Further, the control module 220 can communicate with the charging station 100 and request that the charging station 100 move the transmitter pad(s) 150 from the surface or ground and into the storage unit 170.

Figure 3:
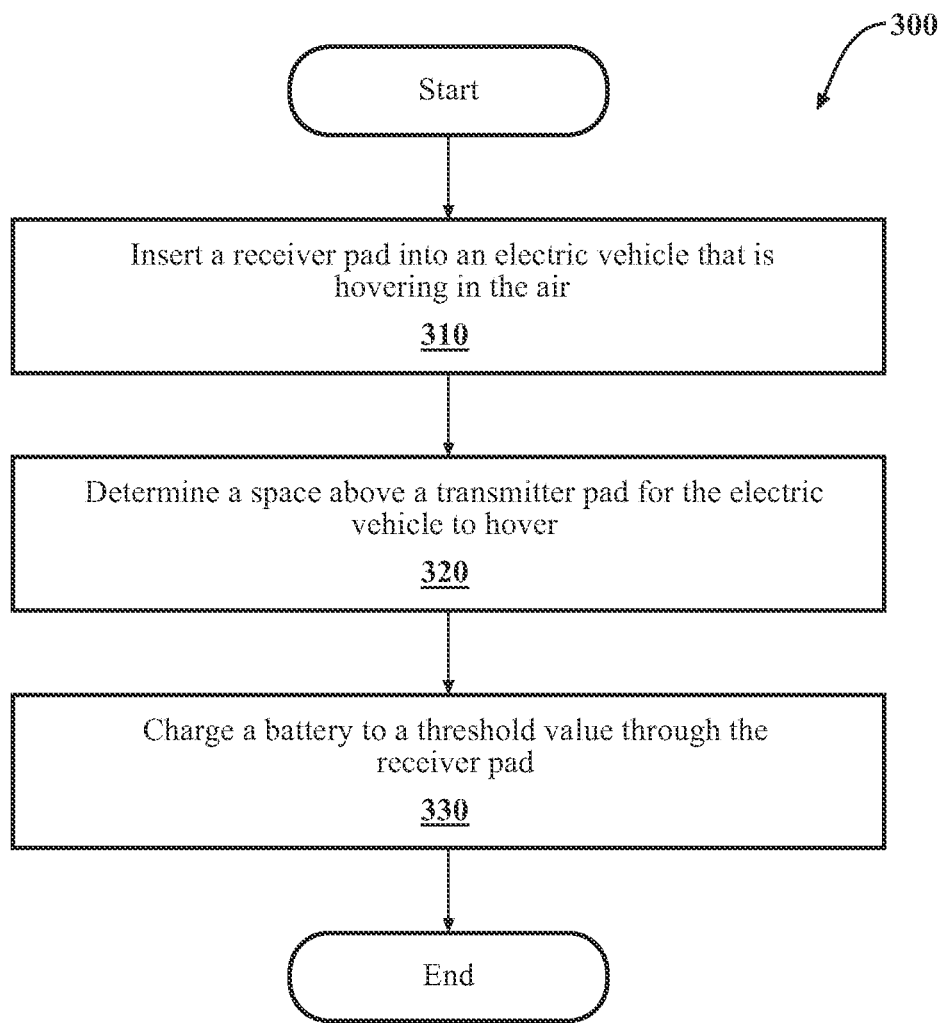
FIG. 3 illustrates a flowchart associated with one embodiment of charging an electric vehicle that is hovering in the air.

FIG. 3 illustrates a flowchart of a method 300 that is associated with one embodiment of charging an electric vehicle that is hovering in the air. Method 300 will be discussed from the perspective of the control unit 120 of FIGS. 1-2. While method 300 is discussed in combination with the control unit 120, it should be appreciated that the method 300 is not limited to being implemented within the control unit 120 but is instead one example of a system that may implement the method 300.

At 310, the control module 220, responsive to determining that the electric vehicle does not include the receiver pad 140, inserts the receiver pad(s) 140 into the electric vehicle that is hovering in the air at the charging station. As previously described, the control module 220 can determine whether the electric vehicle includes the receiver pad(s) 140 using sensor data 250 and/or inquiring from the vehicle and/or the charging station 100 whether the electric vehicle includes the receiver pad(s) 140. Upon determining that the electric vehicle does not include the receiver pad(s) 140, the control module 220 can insert the receiver pad(s) 140 into the electric vehicle that is hovering in the air. As previously mentioned, the control module 220 can control the mechanical arm 160 to insert the receiver pad(s) 140 into the electric vehicle. As another example, the control module 220 can communicate with the charging station 100 to control the mechanical arm 160 to insert the receiver pad(s) 140 into the electric vehicle.

At 320, the control module 220 determines the space above the transmitter pad(s) 150 for the electric vehicle to hover based, at least in part, on the location and the size of the transmitter pad(s) 150. As previously mentioned, the control module 220 can apply a suitable algorithm as well as the location and the size of the transmitter pad(s) 150 to determine the distance that the electric vehicle can be for the battery to be charged.

At 330, the control module 220 charges the battery to the threshold value through the receiver pad(s) 140. As previously mentioned, the control module 220 can determine whether the battery has been charged to threshold value by communicating with the vehicle, the charging station 100, the transmitter pad(s) 150, and/or the receiver pad(s) 140.

Figure 4:
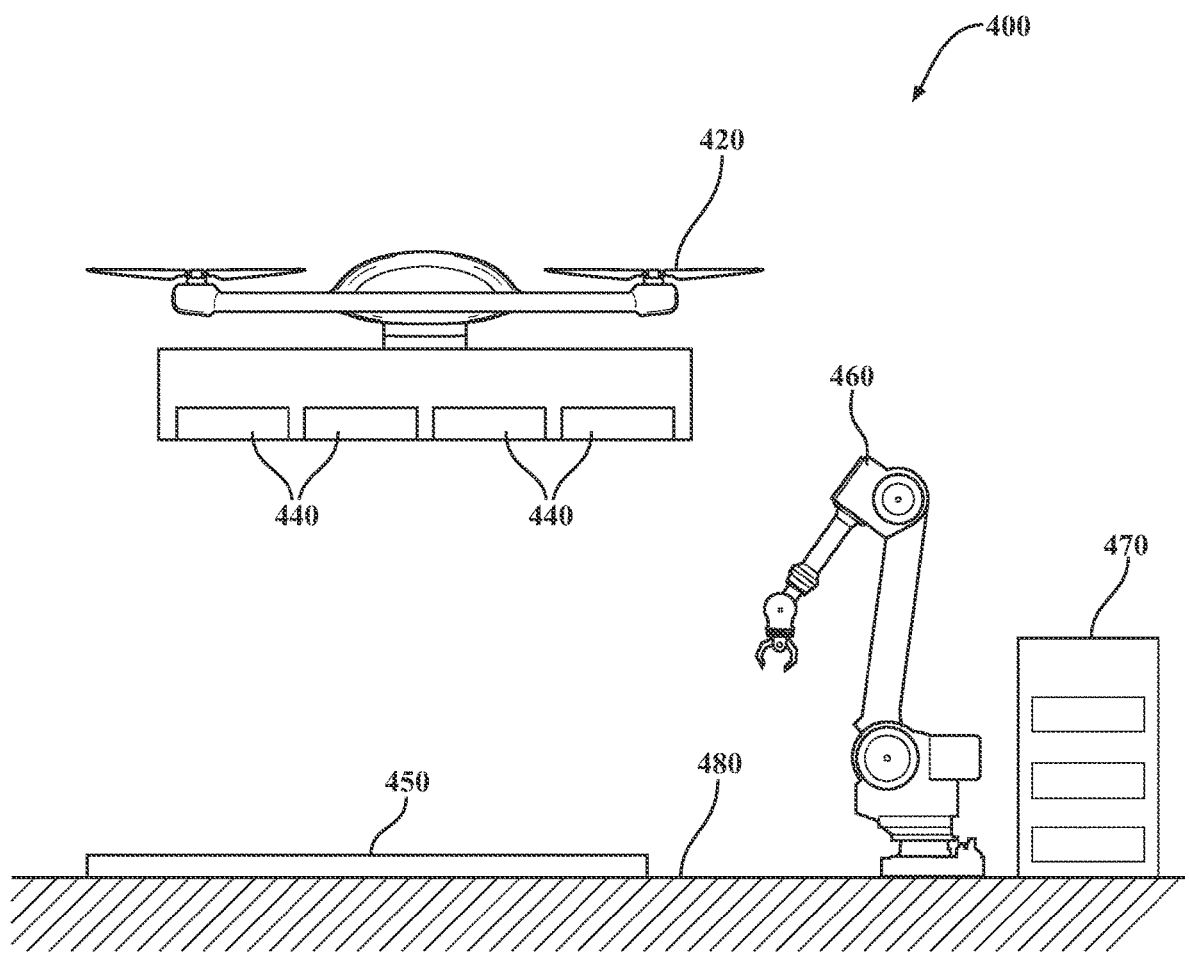
FIG. 4 is an example of a scenario for charging an electric vehicle that is hovering in the air.

A non-limiting example of the operation of the control unit 120, and/or one or more of the methods will now be described in relation to FIG. 4. FIG. 4 shows an example of a scenario for charging an electric vehicle 420 that is hovering in the air.

FIG. 4 shows an electric vehicle 420 that is hovering in the air at a charging station 400. The charging station 400 includes the control unit 120, a mechanical arm 460, and a storage unit 470. The storage unit 470 stores the receiver pad(s) 440 and the transmitter pad(s) 450. The sensor(s) 110 in the control unit 120 can detect the electric vehicle 420 hovering in the air at the charging station 100. The control unit 120 or more specifically, the control module 220 can determine that the electric vehicle 420 is hovering close to the charging station 100. The control unit 120 can communicate with the electric vehicle 420 and inquire whether the electric vehicle 420 includes receiver pad(s) 440. In the case that the response indicates that the electric vehicle 420 does not include receiver pad(s) 440, the control unit 120 can control the mechanical arm 460 to move the receiver pad(s) 440 from the storage unit 470 into the electric vehicle 420. The control unit 120 can determine whether the transmitter pad(s) is on the surface 480 or ground using the sensors 110. In the case that the transmitter pad(s) 450 is not on the surface, the control unit 120 can control the mechanical arm 460 to move the transmitter pad(s) 450 from the storage unit 470 to the surface 480. The control unit 120 can determine the magnetic field that the transmitter pad(s) 450 can generate and can determine where the electric vehicle 420 can be relative to the transmitter pad(s) 450 such that the battery in the electric vehicle 420 can be charged. The control unit 120 can exchange information with the electric vehicle 420 to determine whether the determined space is accessible to the electric vehicle 420. In the case that the space is accessible, the control unit 120 can begin charging the battery. In the case that the space is inaccessible, the control unit 120 can exchange information with the electric vehicle 420 to determine accessible locations and determine what type of transmitter pad(s) 450, the number of transmitter pad(s) 450, and/or the configuration of the transmitter pad(s) 450 that will generate a magnetic field large enough to charge the battery of the electric vehicle 420 while the electric vehicle 420 is in the determined accessible location(s). The control unit 120 can control the mechanical arm 460 to retrieve the transmitter pad(s) 450 from the storage unit 470. The control unit 120 can control the mechanical arm 460 to retrieve the determined type of transmitter pad(s) 450 and the determined number of transmitter pad(s) 450. The control unit 120 can control the mechanical arm 460 to arrange the transmitter pad(s) 450 in the determined configuration.

The control unit 120 can determine the threshold value that the battery is to be charged to by requesting and receiving the threshold value from the electric vehicle 420. The control unit 120 can then activate the receiver pad(s) 440 and the transmitter pad(s) 450 to start generating a magnetic field such that the receiver pad(s) 440 charge the battery. When the control unit 120 determines that the charge in the battery has reached the threshold value, the control unit 120 can deactivate the receiver pad(s) 440 and the transmitter pad(s) 450. The control unit 120 can then control the mechanical arm 460 to remove the receiver pad(s) 440 from the electric vehicle 420 and place in the storage unit 470. The control unit 120 can also control the mechanical arm 460 to move the transmitter pad(s) 450 from the surface 480 to the storage unit 470.

FIG. 1 will now be discussed in full detail as an example environment within which the system and methods disclosed herein may operate. As noted above, the charging station 100 can include the sensor system 110. The sensor system 110 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables a processor to keep up with some external process.

In arrangements in which the sensor system 110 includes a plurality of sensors, the sensors can work independently from each other. Alternatively, two or more of the sensors can work in combination with each other. In such a case, the two or more sensors can form a sensor network. The sensor system 110 and/or the one or more sensors can be operatively connected to a control unit(s) 120, and/or another element of the charging station 100 (including any of the elements shown in FIG. 1). The sensor system 110 can acquire data of at least a portion of the external environment of the charging station 100 (e.g., nearby vehicles).

The sensor system 110 can include various types of sensor. Various examples of different types of sensors will be described herein. However, it will be understood that the embodiments are not limited to the particular sensors described. The sensor system 110 can include one or more environment sensors configured to acquire, and/or sense environment data. "Environment data" includes data or information about the external environment in which the charging station is located or one or more portions thereof. For example, the one or more environment sensors can be configured to detect, quantify and/or sense vehicles in at least a portion of the external environment of the charging station 100 and/or information/data about such vehicles including, as an example, the size, the type, and/or the model of the vehicles. The one or more environment sensors can be configured to detect, measure, quantify and/or sense other things in the external environment of the vehicle, such as, for example, weather conditions, wind conditions, temperature, light conditions, etc.

Various examples of sensors of the sensor system 110 will be described herein. However, it will be understood that the embodiments are not limited to the particular sensors described. As an example, in one or more arrangements, the sensor system 110 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The charging station 100 can include one or more communication unit(s) 130. A "communication unit" refers to a component designed to transmit and/or receive information from one source to another. The one or more communication units 130 transmit and/or receive information via one or more communication networks. The communication network can include an internal communication network as well as an external communication network.

The internal communication network can include a bus in the charging station 100 such as a controller area network (CAN) or the like, and/or other wired and/or wireless mechanisms. The elements of the charging station 100 such as the control unit(s) 120, the sensor system 110, the receiver pad(s) 140, the transmitter pad(s) 150, and the mechanical arm(s) 160 may be communicatively linked to each other through the internal communication network. As used herein, the term "communicatively linked" can include direct or indirect connections through a communication channel or pathway or another component or system. Each of the elements of the charging station 100 can include and/or execute suitable communication software, which enables the various elements to communicate with each other through the communication network and perform the functions disclosed herein. The external communication network represents one or more mechanisms by which the charging station 100 may communicate with other components, e.g., vehicles and other external entities.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC)

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising:
responsive to determining that an electric vehicle does not include a receiver pad, inserting the receiver pad into the electric vehicle while it is hovering in air at a charging station;
determining a space above a transmitter pad for the electric vehicle to hover based, at least in part, on a location and a size of the transmitter pad; and
charging a battery to a threshold value through the receiver pad.

2. The method of claim 1, wherein inserting the receiver pad into the electric vehicle includes:
communicating to request insertion of the receiver pad.

3. The method of claim 1, wherein inserting the receiver pad into the electric vehicle includes:
causing a mechanical arm to insert the receiver pad according to a communication requesting the receiver pad.

4. The method of claim 1, wherein determining the space above the transmitter pad for the electric vehicle to hover includes:
detecting the location and the size of the transmitter pad;
determining a size of a magnetic field between the receiver pad and the transmitter pad based on the location and the size of the transmitter pad; and
determining the space above the transmitter pad for the electric vehicle to hover based on the size of the magnetic field between the receiver pad and the transmitter pad.

5. The method of claim 4, wherein detecting the location and the size of the transmitter pad includes:
detecting the location and the size of the transmitter pad using at least one of a sensor and communicating with the charging station.

6. The method of claim 1, further comprising:
responsive to the battery reaching the threshold value, removing the receiver pad from the electric vehicle using a mechanical arm.

7. The method of claim 1, further comprising:
responsive to the battery reaching the threshold value, removing the receiver pad from the electric vehicle by communicating with the charging station to request removal of the receiver pad.

8. A system, comprising:
one or more processors
a memory communicably coupled to the one or more processors and storing:
a control module including instructions that, when executed by the one or more processors, cause the one or more processors to:
responsive to determining that an electric vehicle does not include a receiver pad, insert the receiver pad into the electric vehicle while it is hovering in air at a charging station;
determine a space above a transmitter pad for the electric vehicle to hover based, at least in part, on a location and a size of the transmitter pad; and
charge a battery to a threshold value through the receiver pad.

9. The system of claim 8, wherein the control module includes instructions to insert the receiver pad into the electric vehicle including instructions to communicate to request insertion of the receiver pad.

10. The system of claim 8, wherein the control module includes instructions to insert the receiver pad into the electric vehicle including instructions to cause a mechanical arm to insert the receiver pad according to a communication requesting the receiver pad.

11. The system of claim 8, wherein the control module includes instructions to determine the space above the transmitter pad for the electric vehicle to hover including instructions to:
detect the location and the size of the transmitter pad;
determine a size of a magnetic field between the receiver pad and the transmitter pad based on the location and the size of the transmitter pad; and
determine the space above the transmitter pad for the electric vehicle to hover based on the size of the magnetic field between the receiver pad and the transmitter pad.

12. The system of claim 11, wherein the control module includes instructions to detect the location and the size of the transmitter pad including instructions to:
detect the location and the size of the transmitter pad using at least one of a sensor and communicating with the charging station.

13. The system of claim 8, wherein the control module includes instructions to, responsive to the battery reaching the threshold value, remove the receiver pad from the electric vehicle using a mechanical arm.

14. The system of claim 8, wherein the control module includes instructions to, responsive to the battery reaching the threshold value, remove the receiver pad from the electric vehicle by communicating with the charging station to request removal of the receiver pad.

15. A non-transitory computer-readable medium including instructions that, when executed by one or more processors, cause the one or more processors to:
responsive to determining that an electric vehicle does not include a receiver pad, insert the receiver pad into the electric vehicle while it is hovering in air at a charging station;
determine a space above a transmitter pad for the electric vehicle to hover based, at least in part, on a location and a size of the transmitter pad; and
charge a battery to a threshold value through the receiver pad.

16. The non-transitory computer-readable medium of claim 15, wherein the instructions to insert the receiver pad into the electric vehicle include instructions to request insertion of the receiver pad.

17. The non-transitory computer-readable medium of claim 15, wherein the instructions to insert the receiver pad into the electric vehicle include instructions to cause a mechanical arm to insert the receiver pad according to a communication requesting the receiver pad.

18. The non-transitory computer-readable medium of claim 15, wherein the instructions to determine the space above the transmitter pad for the electric vehicle to hover include instructions to:
detect the location and the size of the transmitter pad;
determine a size of a magnetic field between the receiver pad and the transmitter pad based on the location and the size of the transmitter pad; and
determine the space above the transmitter pad for the electric vehicle to hover based on the size of the magnetic field between the receiver pad and the transmitter pad.

19. The non-transitory computer-readable medium of claim 18, wherein the instructions to detect the location and the size of the transmitter pad include instructions to detect the location and the size of the transmitter pad using at least one of a sensor and communicating with the charging station.

20. The non-transitory computer-readable medium of claim 15, wherein the instructions include instructions to, responsive to the battery reaching the threshold value, remove the receiver pad from the electric vehicle using a mechanical arm.

* * * * *